L. O. BROWN.
HOSE CLAMP.
APPLICATION FILED APR. 12, 1918.

1,295,001.  Patented Feb. 18, 1919.

INVENTOR
Louis O. Brown
by
Owen, Owen & [illegible]

UNITED STATES PATENT OFFICE.

LOUIS O. BROWN, OF TOLEDO, OHIO.

HOSE-CLAMP.

1,295,001. Specification of Letters Patent. Patented Feb. 18, 1919.

Application filed April 12, 1918. Serial No. 228,205.

*To all whom it may concern:*

Be it known that I, LOUIS O. BROWN, a citizen of the United States, and a resident of Toledo, in the county of Lucas and State of Ohio, have invented a certain new and useful Hose-Clamp; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to hose clamps, and it particularly has for its object to provide a hose clamp which will tightly compress the entire length of the adjoining edges of the sections or parts of the hose to be secured together. It also has for its object to provide a simple means, whereby the parts of a hose may be joined together, and wherein the clamp means may be securely locked in its clamping position.

The invention may be used for clamping or uniting cylindrical objects used for any purpose. I have selected a form of construction containing the invention. The form selected is illustrated in the accompanying drawing.

Figure 1:
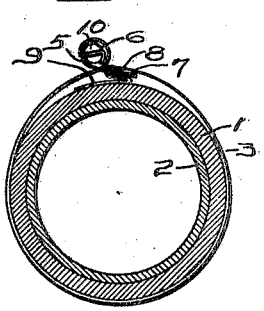
Figure 2:
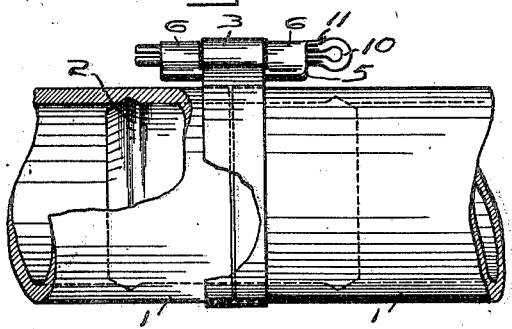
Figure 3:
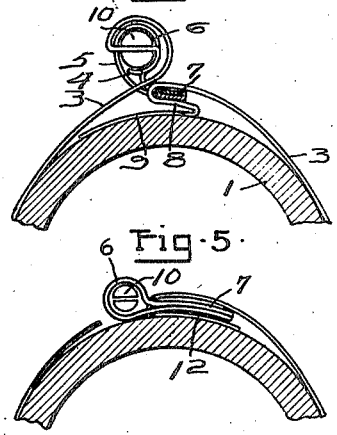
Figure 4:
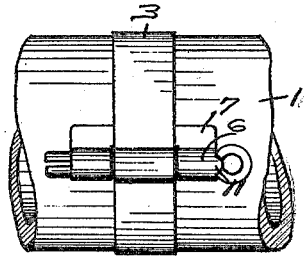
Figure 5:
Figure 6:
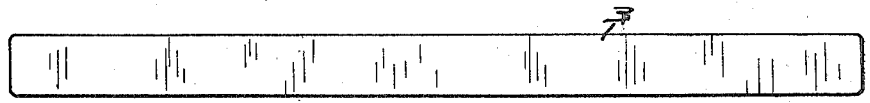
Figure 7:
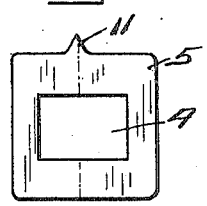

Figure 1 of the drawings is a sectional view of one form of construction containing the invention. Fig. 2 is a side view of the structure illustrated in Fig. 1. Fig. 3 is a sectional view showing conventionally the arrangement of the parts during the clamping operation. The view is slightly distorted in order that the parts may be clearly shown. Fig. 4 is a top view of a device when the hose has been securely clamped. Fig. 5 is a view of a modification. Fig. 6 illustrates a strip used in the clamp, and Fig. 7 is a view of a part of the clamp to which the strip shown in Fig. 6 is connected.

1 indicates the parts of the hose that are joined together by means of a tube 2 commonly made of wood, and the clamping device that embodies my invention. The clamping device is formed of a strip 3 of sheet metal which may be made in any length and parts of any suitable length cut therefrom. The strip 3 is inserted in an opening 4 formed in the member 5 when the member 5 has been bent along its center line to form a substantially cylindrical portion 6 and the winged or leaf portions 7. One end of the strip 3 is inserted in the notch that is formed by the opening when the member 5 has been bent to the form illustrated in Figs. 1 to 5 and the strip 3 is bent over the leaf portions 7 so that a portion thereof extends along the body portion of the strip 3. A part of the end portion is then bent forward and thereby forms the portions 8 and 9, one bent rearwardly and the other bent forwardly. The portion 9 is then laid upon the hose and the strip or band 3 is brought around the hose. A cotter pin 10 may be inserted in the cylindrical portion of the member 5. The other end of the band 3 may be inserted between the legs of the cotter pin and then the cotter pin may be rotated by a nail or other suitable device so as to draw the band tightly around the hose.

In joining two parts of a hose together, the band is placed over the edges of the hose and when it is tightly drawn, it clamps the edges to the spool or tube 2. In the drawing operation, there is a tendency to crimp the hose beneath the cotter pin. The portion 9 of the band 3 however, is bent so as to be located directly below the cotter pin, so that in the squeezing operation, the portion 9 tightly presses the edges at that point and prevents them rising from the tube 2. On account of the thickness of the metal which is located below the cotter pin, at that point, and the flat surface that the portion 9 of the band presents, the edges of the hose at that point are tightly pressed and clamped to the tube 2. By this arrangement, the edges of the parts of the hose are tightly clamped throughout their entire length.

The member 5 is provided with a sharp finger 11 so located on the member 5 that when it is bent to form, the finger 11 will be located on the end of the cylindrical portion of the member 5. The cotter pin 10 is inserted in the cylindrical portion of the member 5, preferably, so that the head of the cotter pin will be located at the same end of the cylindrical portion that the finger 11 is located on. When the cotter pin 10 has been turned by the use of a nail, or other instrument, which may be inserted in the head of the cotter pin, to tightly draw the end of the strip or band 3 and when the strip 3 has been drawn tight, the finger 11 may be bent down into the eye or between the legs of the cotter pin. If desired, the cotter pin 10 may be subsequently driven into the cylindrical portion of the member 5 and the finger 11 driven down farther into the eye of the cotter pin. A simple means is thus provided for locking the cotter pin and consequently the clamp in its clamping position. In the modification shown in Fig. 5, the member 5 is so formed that the leafed portions 7 are preferably made wider and bent to conform to the shape of the hose in connection with which it is designed to be used as a clamp. Also in this form, the end 12 is bent back beneath the curved portion, thus holding both of the leaf portions in position.

I claim:

1. In a hose clamp, a leaf member having a cylindrical portion and a slot in the cylindrical portion, a strip having one end bent rearwardly toward the body of the strip and a portion of the end bent forwardly away from the body of the strip and located beneath the cylindrical portion of the leaf member, a cotter pin located in the cylindrical portion for receiving the other end of the strip through the slot, means for locking the cotter pin in its clamping position.

2. In a hose clamp, a leaf member having a cylindrical portion and a slot in the cylindrical portion, a strip having one end bent rearwardly toward the body of the strip and located beneath the cylindrical portion of the leaf member, a cotter pin located in the cylindrical portion for receiving the other end of the strip through the slot, a leaf member having a V-shape finger located at one end of the cylindrical portion for engagement of the cotter pin to lock the cotter pin in the clamping position of the clamp.

3. In a hose clamp, a sheet metal double-leaf member having a portion thereof bent to form a cylinder, a cotter-pin located in the cylindrical portion of the leaf-member, the cylindrical portion having a slot, a strip bent at one end and hooked into the slot of the leaf member and in which the other end of the strip may be inserted when inserted between the legs of the cotter-pin, and means forming a part on the leaf member for insertion between the parts of the cotter pin for locking the cotter-pin in its rotated position.

4. In a hose clamp, a sheet metal double-leaf member having a portion thereof bent to form a cylinder, a cotter-pin located in the cylindrical portion of the leaf-member, the cylindrical portion having a slot, a strip bent at one end and hooked into the slot of the leaf member and in which the other end of the strip may be inserted when inserted between the legs of the cotter-pin, a portion of the sheet metal of the leaf member forming a finger for insertion between the parts of the cotter-pin to lock the cotter-pin.

5. In a hose clamp, a sheet metal double-leaf member bent to form an enlarged cylindrical portion along one side of the leaf member, the cylindrical portion having a slot, a strip having one end bent rearwardly toward the body of the strip and a portion of said end bent forwardly away from the body of the strip and extending beneath and beyond the cylindrical portion of the leaf member, and away from the body portion of the strip, a cotter-pin located in the cylindrical portion for receiving the other end of the strip through the slot.

In testimony whereof, I have hereunto signed my name to this specification.

LOUIS O. BROWN